(12) United States Patent
Onggosanusi et al.

(10) Patent No.: US 9,755,708 B2
(45) Date of Patent: Sep. 5, 2017

(54) HIGH DATA RATE UPLINK TRANSMISSION

(75) Inventors: Eko N. Onggosanusi, Allen, TX (US);
Tarik Muharemovic, Dallas, TX (US);
Anand G. Dabak, Plano, TX (US);
Runhua Chen, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1607 days.

(21) Appl. No.: 12/424,318

(22) Filed: Apr. 15, 2009

(65) Prior Publication Data

US 2009/0262856 A1    Oct. 22, 2009

Related U.S. Application Data

(60) Provisional application No. 61/045,494, filed on Apr. 16, 2008, provisional application No. 61/047,345, filed on Apr. 23, 2008, provisional application No. 61/074,399, filed on Jun. 20, 2008, provisional application No. 61/087,398, filed on Aug. 8, 2008.

(51) Int. Cl.
| | |
|---|---|
| *H04L 5/16* | (2006.01) |
| *H04B 7/0413* | (2017.01) |
| *H04B 7/06* | (2006.01) |
| *H04L 1/18* | (2006.01) |
| *H04B 7/04* | (2017.01) |

(52) U.S. Cl.
CPC ......... *H04B 7/0413* (2013.01); *H04B 7/0615* (2013.01); *H04L 1/1867* (2013.01); *H04B 7/0465* (2013.01); *H04B 7/0478* (2013.01)

(58) Field of Classification Search
USPC ......................................... 375/219, 267, 285
See application file for complete search history.

(56) References Cited

U.S. PATENT DOCUMENTS

| | | | |
|---|---|---|---|
| 6,865,237 B1* | 3/2005 | Boariu et al. ................. | 375/295 |
| 8,107,563 B2* | 1/2012 | Yoon et al. .................... | 375/341 |
| 2007/0011550 A1* | 1/2007 | Agrawal et al. .............. | 714/746 |
| 2008/0186880 A1* | 8/2008 | Seki et al. ..................... | 370/281 |
| 2008/0212701 A1* | 9/2008 | Pan et al. ....................... | 375/260 |
| 2011/0085507 A1* | 4/2011 | Jongren ........................ | 370/329 |

* cited by examiner

*Primary Examiner* — Janice Tieu
(74) *Attorney, Agent, or Firm* — Ronald O. Neerings; Charles A. Brill; Frank D. Cimino (57) ABSTRACT

A user equipment device has a control information decoder configured to receive and decode an uplink scheduling grant. A transmit module is configured to receive a rank indicator (RI) extracted by the decoder and adapt a transmission rank in response to the RI. At least two transmit antennas are configured to transmit according to the RI.

3 Claims, 8 Drawing Sheets

HIGH DATA RATE UPLINK TRANSMISSION

CROSS-REFERENCE TO RELATED APPLICATIONS

This application claims the benefit of U.S. Provisional Application Ser. No. 61/045,494, filed by Eko N. Onggosanusi, Tarik Muharemovic, Anand Dabak and Runhua Chen on Apr. 16, 2008, entitled "Backward Compatible Uplink Single User MIMO (UL SU-MIMO)", commonly assigned with this application and incorporated herein by reference.

This application also claims the benefit of U.S. Provisional Application Ser. No. 61/047,345, filed by Eko N. Onggosanusi, Tarik Muharemovic, Anand Dabak and Runhua Chen on Apr. 23, 2008, entitled "Backward Compatible Uplink Single User MIMO (UL SU-MIMO)", commonly assigned with this application and incorporated herein by reference.

This application further claims the benefit of U.S. Provisional Application Ser. No. 61/074,399, filed by Eko N. Onggosanusi, Tarik Muharemovic, Anand Dabak and Runhua Chen on Jun. 20, 2008, entitled "Backward Compatible Uplink Single User MIMO (UL SU-MIMO)", commonly assigned with this application and incorporated herein by reference.

This application further claims the benefit of U.S. Provisional Application Ser. No. 61/087,398, filed by Eko N. Onggosanusi, Tarik Muharemovic, Anand Dabak and Runhua Chen on Aug. 8, 2008, entitled "Backward Compatible Uplink Single User MIMO (UL SU-MIMO)", commonly assigned with this application and incorporated herein by reference.

This application is filed concurrently with U.S. patent application Ser. No. 12/424,439, to Chen and Onggosanusi, commonly assigned with this application and incorporated herein by reference.

TECHNICAL FIELD

The present disclosure is directed, in general, to a wireless communication system and, more specifically, to Multiple-Input Multiple-Output (MIMO) communication employing a user equipment device, a base station and methods of operating a user equipment device and a base station.

BACKGROUND

MIMO communication systems offer large increases in throughput due to their ability to support multiple parallel data streams that are each transmitted from different antennas. In single user MIMO (SU-MIMO), a user is served by one base station, and the user occupies a transmission resource, such as time or frequency, exclusively. SU-MIMO requires that the user has multiple transmit antennas and receive antennas. An objective of the protocol is to increase the data rate and communication reliability by exploiting the spatial multiplexing gain or spatial diversity gain available in MIMO channels.

In the most general form, MIMO transmissions employ a number of parallel spatial streams that are independently forward error correction (FEC) encoded. Each stream, also termed a codeword associated with a transport block, is then mapped to one or more spatial transmission layers. Mapping to multiple antennas can be done by introducing a linear transformation from the transmission layers to the physical antennas. The number of spatial transmission layers is called the rank of transmission, and the layers are mapped to the physical transmit antennas. This mapping is typically accomplished by linearly combining the layer signals to obtain the actual transmit signals. This operation is also termed pre-coding. A pre-coding matrix can be selected from a pre-determined set of matrices called a codebook. In such a case, the pre-coding operation is termed codebook-based pre-coding. It is also possible to perform non-codebook-based pre-coding. Overall, codebook-based signaling tends to require less signaling overhead.

Although current MIMO communications offer advantages over single antenna systems, further improvements would prove beneficial in the art.

SUMMARY

Embodiments of the present disclosure provide a user equipment device, a base station, a method of operating a user equipment device, and a method of operating a base station. In one embodiment, a user equipment device has a control information decoder configured to receive and decode an uplink scheduling grant. A transmit module is configured to receive a rank indicator extracted by the decoder and adapt a transmission rank in response to the rank indicator. At least two transmit antennas are configured to transmit according to the rank indicator.

Another embodiment is a method of operating a user equipment device. The method includes receiving and decoding an uplink scheduling grant. A rank indicator is extracted from the grant. The device adapts a transmission rank in response to the rank indicator. The device transmits using at least two transmit antennas configured according to the rank indicator.

In another embodiment, a base station has at least two receive antennas. The base station includes a control information generator operable to generate an uplink scheduling grant including a rank indicator. A control information encoder is configured to transmit the grant including the rank indicator. The base station includes a receive module configured to receive and decode a transmission consistent with the grant.

Another embodiment is a method of operating a base station having at least two receive antennas. The method includes generating an uplink scheduling grant including a rank indicator, and transmitting the uplink grant. The base station receives a transmission that is consistent with the grant.

BRIEF DESCRIPTION

Reference is now made to the following descriptions taken in conjunction with the accompanying drawings, in which.

DETAILED DESCRIPTION

Embodiments described herein and otherwise within the scope of the disclosure benefit from the recognition that the communications channels between a UE device and a base station, generally denoted eNodeB, already established by existing LTE standards may be used to convey sufficient information to support multilayer transmission, e.g., SU-MIMO, on the uplink from the UE to the eNodeB.

Throughout this disclosure, the following acronyms have the accompanying corresponding meanings:
   UE: user equipment, or user equipment device
   eNodeB: enhanced base station node
   DL: communication from the eNodeB to the UE
   UL: communication from the UE to the eNodeB
   RI: rank indicator
   CQI: channel quality indicator
   PMI: pre-coding matrix indicator
   SRS: sounding reference signal
   DMRS: demodulation reference signal
   PDSCH: physical downlink shared (data) channel
   PDCCH: physical downlink control channel
   PUCCH: physical uplink control channel
   PUSCH: physical uplink shared (data) channel
   PHICH: physical hybrid ARQ indicator channel
   ACK/NAK: acknowledged/negative acknowledged
   OL-SM: open-loop spatial multiplexing
   CL-SM: closed-loop spatial multiplexing
   OFDM: orthogonal frequency-division multiplexing
   OFDMA: orthogonal frequency-division multiple access The term "open-loop MIMO" (OL-MIMO), or OL-SM, refers to MIMO schemes for which pre-coding (e.g., selection of a pre-coding matrix) is not dependent on the MIMO channel. For example the pre-coding information is selected based on a fixed (non-channel-dependent) selection criterion. The transmit rank may or may not be adapted in a channel-dependent manner.

The term "closed-loop MIMO" (CL-MIMO), or CL-SM, refers to MIMO schemes for which pre-coding (e.g., selection of a pre-coding matrix) is adapted dependent on the MIMO channel. The transmit rank may or may not be adapted in a channel-dependent manner.

The transmission rank is defined as the number of spatial transmission layers (reflected in the number of columns in the pre-coding matrix). This applies in both downlink and uplink SU-MIMO.

The Evolved Universal Terrestrial Radio Access (E-UTRA) LTE specification, designated Rel. 8, supports up to four transmit antennas on downlink (DL), allowing DL data rates as high as about 326 Mbit/s per 20 MHz of spectrum bandwidth. However, only one UL transmit antenna is supported, so SU-MIMO is not supported on the UL. This limits the UL peak data rate to about 86 Mbit/s per 20 MHz of spectrum bandwidth. Thus, the signaling aspects of E-UTRA Rel. 8 are designed with this restriction in mind.

Embodiments herein address the asymmetry between UL and DL by presenting a UE device, a base station, a method of operating a UE device and a method of operating a base station. The UE device and the base station cooperate to provide multiple layers on the UL within the framework of current communications protocols between the UE and an eNodeB.

It is an objective of the various embodiments herein to provide for at least a doubling of the UL peak data rate from conventional communication protocol. It is further an objective to achieve this doubling while retaining backward compatibility with conventional protocols, such as, e.g., LTE Rel. 8, and support for two or four transmit antennas at the UE. While these objectives guide the various embodiments presented herein, such objectives are not to be construed as limitations on embodiments otherwise within the scope of the disclosure.

A conventional DL SU-MIMO system includes an eNodeB and one or more UE units. In conventional operation, the UE conveys one or more feedback signals to the eNodeB to support SU-MIMO on the DL. The feedback signals are often termed the UE reporting parameters. For example, the UE may provide feedback to the eNodeB in the form of a channel quality indicator (CQI), rank indicator (RI) and pre-coding matrix indicator (PMI) to indicate a quality attribute of a transmission resource (e.g., sub-band) allocated for communication from the eNodeB to the UE. The eNodeB may determine a transmission rank, a pre-coding matrix, and a modulation and coding scheme for each codeword (transport block) depending on the feedback. Feedback is conventionally considered to be such information conveyed by the UE to the eNodeB.

The eNodeB transmits DL data to the UE on a physical downlink data channel (PDSCH). In addition, the eNodeB transmits uplink control information via an uplink scheduling grant on a physical downlink control channel (PDCCH). An uplink scheduling grant, equivalently referred to hereinafter for brevity as an uplink grant, or simply a grant, is a collection of operating parameters instructing the UE how to communicate with the eNodeB in the uplink, thereby granting access to the eNodeB. A conventional uplink grant is relatively simple, since the conventional system does not support multi-rank transmission on the UL. Embodiments of an uplink grant that support UL SU-MIMO are presented below.

A physical hybrid ARQ indicator channel (PHICH) typically includes an ACK/NAK signal (transmitted in DL) to acknowledge receipt of UL data. The conventional UE transmits uplink data to the eNodeB on a physical uplink shared channel (PUSCH), and UE reporting parameters to support DL transmissions (e.g., CQI, PMI, and/or RI) via a physical uplink control channel (PUCCH). Note that such UE reporting parameters can also be transmitted via PUSCH. A sounding reference signal (SRS) and a demodulation reference signal (DMRS) are conventionally provided in the UL to be used by the eNodeB to measure the uplink channel, select appropriate layer mapping and perform UL data demodulation.

Additional aspects of CL-MIMO communications systems may be found in U.S. patent application Ser. No. 11/851,849, "Antenna Grouping And Group-Based Enhancements For MIMO Systems" to Varadarajan and Onggosanusi, incorporated herein by reference in its entirety; Ser. No. 11/688,756, "A Pre-Coder Selection Based On Resource Block Grouping" to Onggosanusi, Varadarajan and Dabak, incorporated herein by reference in its entirety; U.S. patent application Ser. No. 12/042,246, "User Equipment Feedback Structures for MIMO OFDMA" to Onggosanusi, Chen, Shen and Varadarajan, incorporated herein by reference in its entirety; and U.S. patent application Ser. No. 12/170,319, "Efficient Rank and Pre-coding Matrix Feedback for MIMO Systems" to Chen, Onggosanusi, Varadarajan and Dabak, incorporated herein by reference in its entirety.

Advantageously, the embodiments herein provide the desired increase of UL data rate, while providing backward compatibility with existing standards. Various embodiments described herein address the aforementioned objectives by including one or more of the following features:
   Support for dynamic rank adaptation (in which rank or the number of transmission layers is adapted based on the short-term channel on the physical layer), pre-coding for closed-loop spatial multiplexing (CL-SM);

Possible support of open-loop spatial multiplexing (OL-SM);

Use of the PDCCH to provide an uplink grant including necessary information, e.g., a transmit PMI to support codebook-based pre-coding and/or a transmit RI, from the eNodeB to the UE.

Use of the uplink SRS to enable the eNodeB to estimate the channel quality for link adaptation, including pre-coder and rank adaptation;

Use of the DMRS to obtain channel estimation for PUSCH data demodulation;

Prohibiting the UE from overriding a channel assignment provided by the eNodeB;

Retaining the use of the PHICH to transmit the downlink ACK/NAK; and

Transmitting data from the UE to the eNodeB via the PUSCH.

Figure 1A:
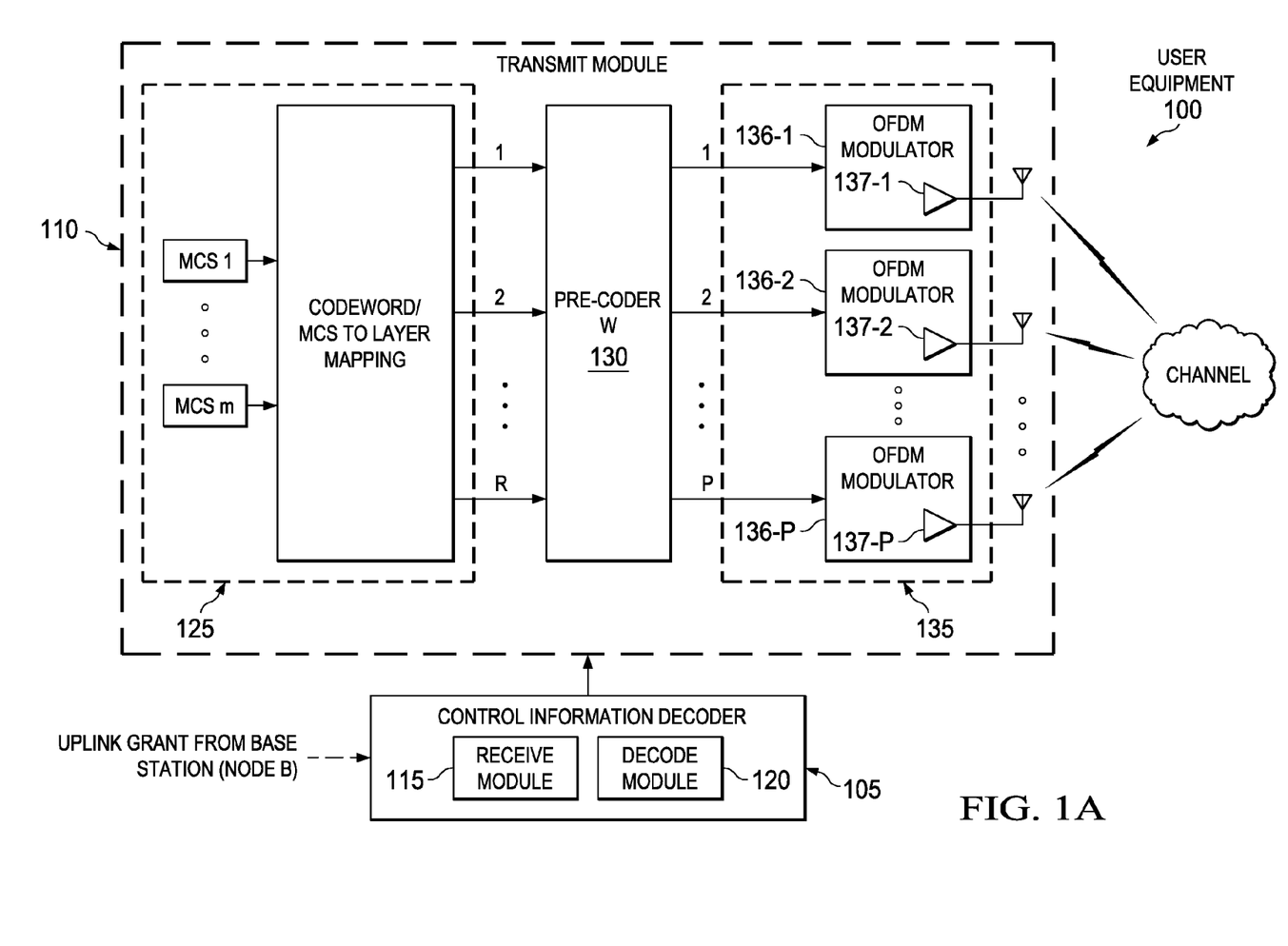
FIG. 1A illustrates a system diagram of a user equipment (UE) device as provided by one embodiment of the disclosure.

FIG. 1A illustrates an embodiment of a UE device 100, referred to for brevity as the UE 100. A user equipment device is generally a device that includes a transmitter and a receiver, and is configured to communicate with a base station. User equipment includes but is not limited to a mobile station, a fixed or mobile subscriber unit, a pager, a cellular telephone, a personal digital assistant (PDA), a computer equipped with a network card, or any other type of user device capable of communicating with a base station. The UE 100 includes a control information decoder 105 and a transmit module 110.

Figure 1B:
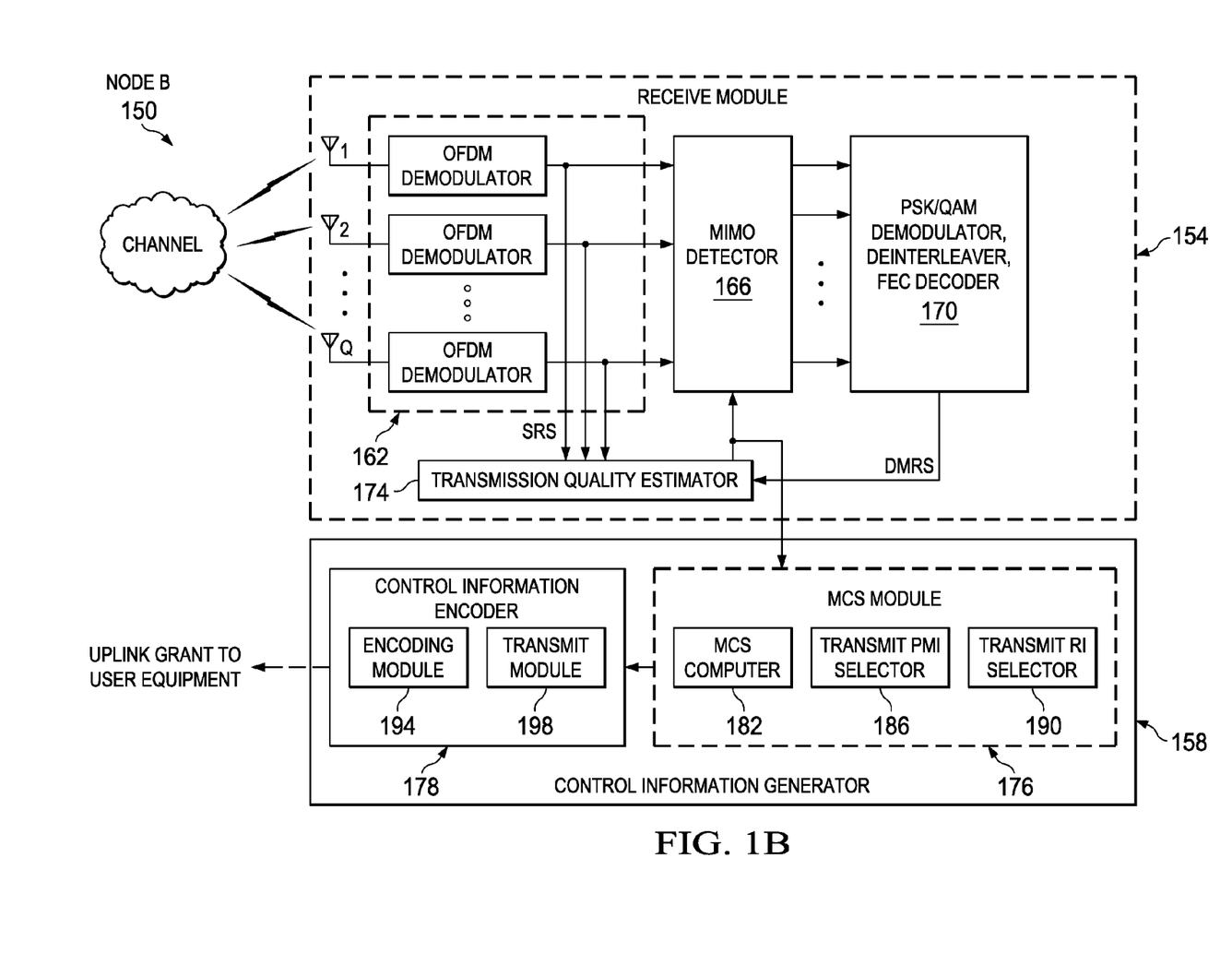
FIG. 1B illustrates a system diagram of a base station as provided by one embodiment of the disclosure.

FIG. 1B illustrates a base station 150. The base station 150 may be an enhanced base station, synonymously referred to herein without limitation as the eNodeB 150. A base station is a network node that includes, e.g., a transmitter and a receiver configured to communicate with user equipment devices. The base station is typically associated with a network site which encompasses at least one cell, and is configured to provide network service to multiple user equipment devices within the site. The eNodeB 150 includes a receive module 154 and a control information generator 158. The receive module 154 employs transmission signals from the UE 100, which includes multiple transmit antennas, and is configurable to transmit an uplink scheduling grant to the UE 100 that includes at least one of transmit RI and transmit PMI. The terms "transmit RI" and "transmit PMI" convey the distinction between the RI and PMI provided in the uplink scheduling grant from the RI and the PMI exchanged between a UE and a base station in conventional DL SU-MIMO. Hereinafter, where the terms RI and PMI appear without qualification, they are understood to be a transmit RI and a transmit PMI, respectively.

The UE 100 is capable of adapting the transmission rank in response to the RI and/or adapting the pre-coding matrix in response to the PMI. Note that the RI and PMI can be defined separately as two separate pre-coding-related parameters, or jointly as a single pre-coding-related parameter. The earlier definition is suitable when the size of pre-coding codebook is uniform across different ranks. The latter definition may be more economical when the size of pre-coding codebook is different across different ranks. In general, smaller size could be assigned to higher ranks since pre-coding gain tends to decrease for higher ranks.

In FIG. 1A, the transmit module 110 includes a modulation and coding scheme (MCS) module 125, a precoder 130 and a modulator section 135. The transmit module 110 is employed to transmit data provided by the MCS module 125 to the eNodeB 150 based on pre-coding provided by the precoder 130. The MCS module 125 receives an RI extracted by the decoder 105 from an uplink grant from the eNodeB 150. The module 125 maps m codewords, where $m \geq 1$, to R spatial layers or transmit streams. R is the transmission rank, which is at least one. Each codeword consists of FEC-encoded, interleaved, and modulated information bits. The module 125 may be configured, e.g., for multi-rank transmission, such as rank 2 or rank 4. The signal associated with each codeword (MCS 1, . . . , MCS m) may take different formats. For UL transmission which utilizes OFDMA, each codeword may be composed of a series of PSK (such as QPSK) or QAM (such as 16QAM and 64QAM) data symbols. In LTE, the UL transmission is based on DFT-spread OFDMA or single-carrier FDMA as a special case. In such cases, an additional spreading/pre-coding with a DFT (Discrete Fourier Transform) matrix is performed for each codeword after the PSK/QAM modulation operation. The DFT spreading is typically performed across all the assigned modulated symbols per codeword.

The MCS module 125 maps the m codewords to R layers and provides R spatial streams to the precoder 130. The precoder 130 receives a PMI extracted by the decoder 105 from the uplink grant, and processes data, e.g., the R spatial streams, with a pre-coder matrix associated with the PMI. The precoder 130 provides input to each of P modulators 136-1, 136-2, . . . , 136-P in the modulator section 135 with a desired P×R pre-coding matrix W, where P is the number of UE transmit antennas, and $P \geq R$. The modulators 136 are illustrated without limitation as OFDM modulators. In some embodiments, the modulators 136 are OFDMA modulators. Each modulator 136-1, 136-2, . . . , 136-P includes an associated power amplifier 137-1, 137-2, . . . , 137-P. Each power amplifier 137 amplifies an output of the associated modulator 136 for transmission by an associated antenna. The UE 100 includes at least two transmit antennas. The UE 100 also transmits one or more reference signals, e.g., an uplink SRS or a DMRS, that the eNodeB 150 may use to estimate the uplink channel quality.

The receive module 154 of the eNodeB 150 (FIG. 1B) receives the transmission from the UE 100. The receive module 154 includes a demodulator module 162 having, e.g., Q OFDM demodulators coupled to corresponding receive antenna(s). In some embodiments the module 162 uses OFDMA modules. For an OFDM-based UL system, as is the illustrated embodiment, the demodulator provides Q demodulated data streams to a MIMO detector 166, which provides data streams to a decoding module 170 that performs PSK/QAM demodulation, de-interleaving, and FEC decoding. For UL systems with DFT-spread OFDMA, an inverse DFT spreading is generally performed prior to the PSK/QAM demodulation.

The control information generator 158 includes an MCS module 176 and a control information encoder 178. The MCS module 176 includes an MCS computer 182, a transmit PMI selector 186, and a transmit RI selector 190. The MCS module 176 may be implemented in software, hardware, or a combination thereof.

A transmission quality estimator 174 determines a quality of the RF link from the UE 100 to the eNodeB 150 and of one or more data channels output by the demodulator module 162. The estimator 174 may employ one or more reference signals transmitted by a transmitter, e.g., the UE 100, to make the estimation. In the illustrated embodiment, e.g., the estimator 174 receives Q SRS signals from the module 162 and a DMRS signal from the module 170. The SRS, discussed further below, enables the eNodeB 150 to estimate the channel quality for rank/PMI adaptation. In the illustrated embodiment, the module 176 receives a channel/interference estimate from the estimator 174 from the module 170. In other embodiments, the module 176 may receive the SRS and the DMRS directly.

In various embodiments, the SRS enables eNodeB to measure the UL-MIMO channel and is configured to provide information on the types of adaptation modes which are analogous to different CQI reporting modes in DL-MIMO. For example, the SRS may enable the eNodeB 150 to measure the UL-MIMO channel to derive the rank, pre-coding, and modulation and coding scheme for UL-MIMO transmission. In preferred embodiments, the SRS is not precoded. In some embodiments, the DMRS provides channel estimation for data (PUSCH) demodulation. Hence, DMRS can be preceded, with the number of DMRS layers following the transmit RI. The module 176 provides to the encoder 178 a transmit PMI via the selector 186, a transmit RI via the selector 190.

An encoding module 194 assembles an uplink grant that includes the transmit RI and transmit PMI. The transmit RI and the transmit PMI represent an uplink transmission configuration of the UE 100. A transmit module 198 transmits the uplink grant to the UE 100.

The decoder 105 (FIG. 1A) includes a receive module 115 and a decode module 120. The receive module 115 accepts the uplink grant from the eNodeB 150. The decode module 120 decodes the uplink grant and provides the contents thereof, including, e.g., a RI and a PMI, to the transmit module 110. The decode module 110 may also derive the pre-coding matrix from the transmit PMI and provide the matrix to the transmit module 110 The pre-coder matrix may be retrieved, e.g., using the PMI to index a memory within the decoder 105. In some embodiments, the retrieval is performed within the pre-coder 130 using the PMI. The transmit module 110 may then initiate an SU-MIMO data transmission consistent with the uplink grant.

Note that the preceding description corresponds to CL-SM where the PMI or RI is adaptively configured based on the channel, assigned by the eNodeB 150 and used to select a precoder at the UE 100. The illustrated embodiments of the UE 100 and the eNodeB 150 may also support OL-SM, in which the PMI is assigned according to a fixed criterion and is not channel-dependent. In both operational modes the SRS and DMRS may still be transmitted by the UE 100 to the eNodeB 150, and the eNodeB 150 may return an uplink grant including an RI.

Figure 2:
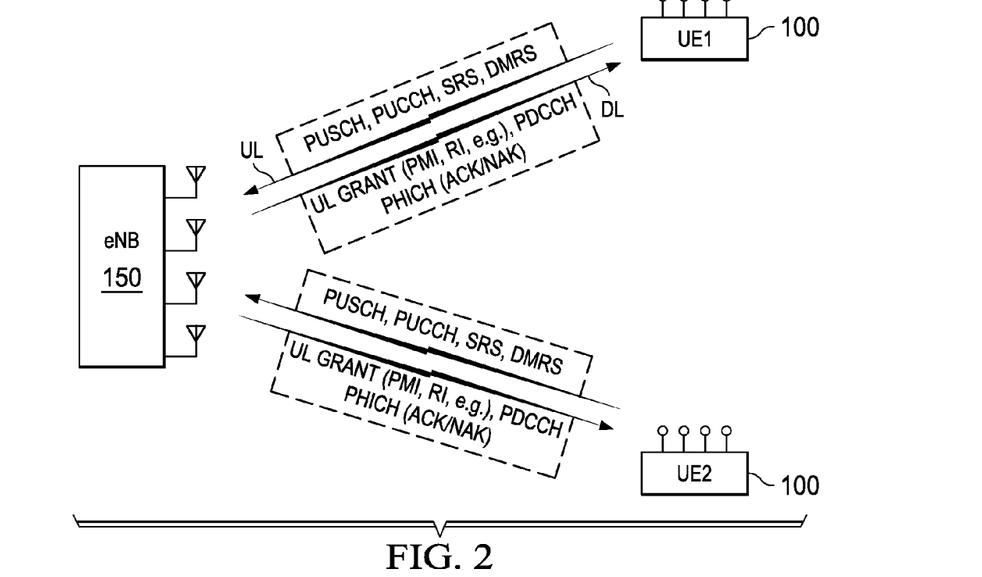
FIG. 2 illustrates signaling between a UE device and a base station.

The cooperative signaling between the eNodeB 150 and two UE 100 is schematically illustrated in FIG. 2. This embodiment is illustrated without limitation as including four transmit and four receive antennas (e.g., 4×4 UL SU-MIMO). Signaling between the eNodeB 150 and each UE 100 includes a DL and a UL. The DL includes a PDCCH and a PHICH. The PDCCH conveys the uplink grant. The PHICH conveys the DL ACK/NAK in response to UL data, as is the case for a conventional system. The UL includes, e.g., an SRS and a DMRS, a PUSCH and a PUCCH. As mentioned previously the eNodeB 150 may use the SRS to estimate the channel quality.

For DL SU-MIMO transmission, the UE 100 may feed back the recommended DL transmission format (e.g., PMI/CQI/RI) in the form of UL control feedback to the eNodeB 150. The eNodeB 150 retains control over the communications protocol by having the ability to override the UL control feedback. In other words, the eNodeB 150 does not necessarily follow the recommendation/feedback provided by the UE 100, and may choose a different transmission format.

In contrast to DL-MIMO, in UL-MIMO operation the control parameters are determined by the eNodeB 150. The eNodeB 150 selects the parameters to be used on the UL channel using, e.g., the SRS. The selected control parameters may then be transmitted to UE 100 in the uplink grant via PDCCH. The uplink grant may then be used for UL-MIMO transmission from the UE 100 to the eNodeB 150. In various embodiments, the parameters selected by the eNodeB 150 are not overridden by the UE 100. In other words, in such embodiments, the UE 100 always follows the transmission format (e.g. PMI/RI) selected by the eNodeB 150.

In another embodiment, the signaling between the UE 100 and the eNodeB 150 employs an additional uplink physical control parameter that carries more detailed channel quality information. This control entity may be viewed as being analogous to the CQI employed in DL closed-loop operation, and is referred to herein as a UL CQI. The UL CQI may be particularly beneficial in embodiments in which non-codebook based pre-coding is used. However, use of the UL CQI may result in additional downlink control overhead that may be undesirable in some circumstances.

Figure 3A:
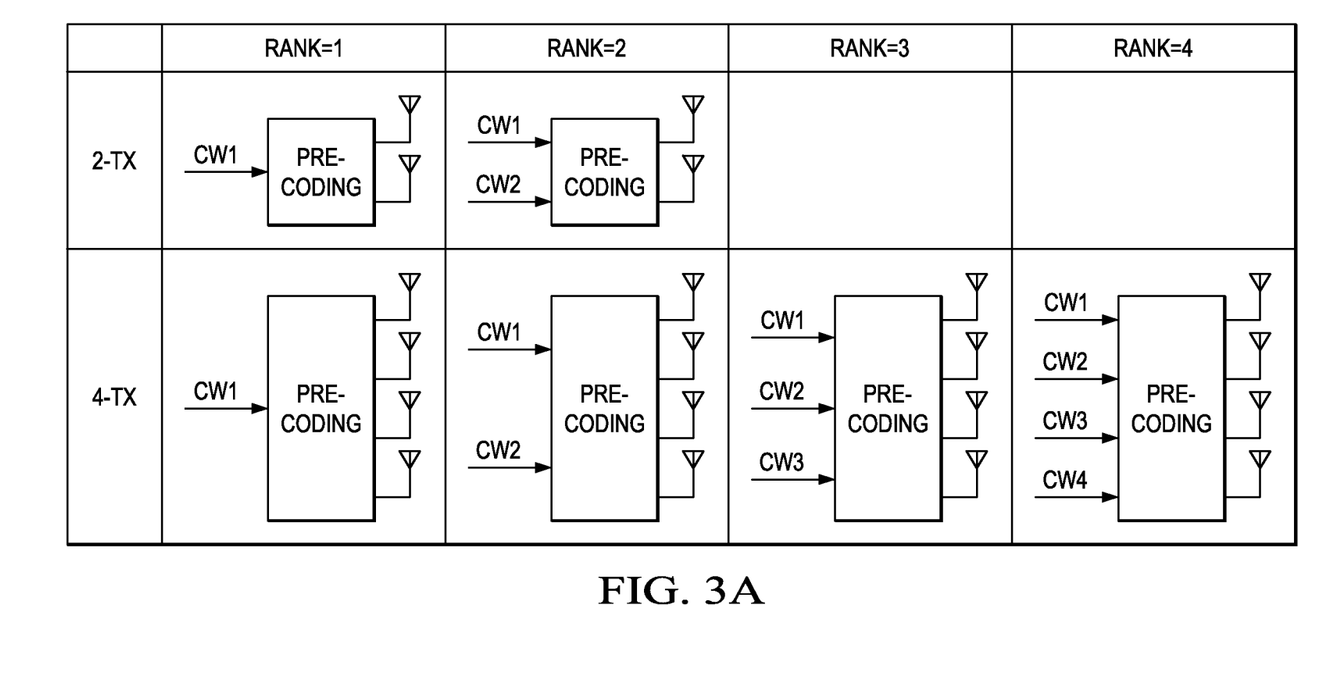
FIGS. 3A-3D illustrate embodiments of codeword-to-layer mapping.

FIGS. 3A-3D illustrate various embodiments of layer mapping that are consistent with the principles of the UL SU-MIMO embodiments presented herein. In FIG. 3A, the number of codewords equals the number of layers. Thus, in the number of codewords is equal to the rank for two-antenna transmission (2-TX) and four antenna transmission (4-TX). While conceptually simple, this embodiment requires relatively high signaling overhead, and may not be suitable in some cases.

Figure 3B:
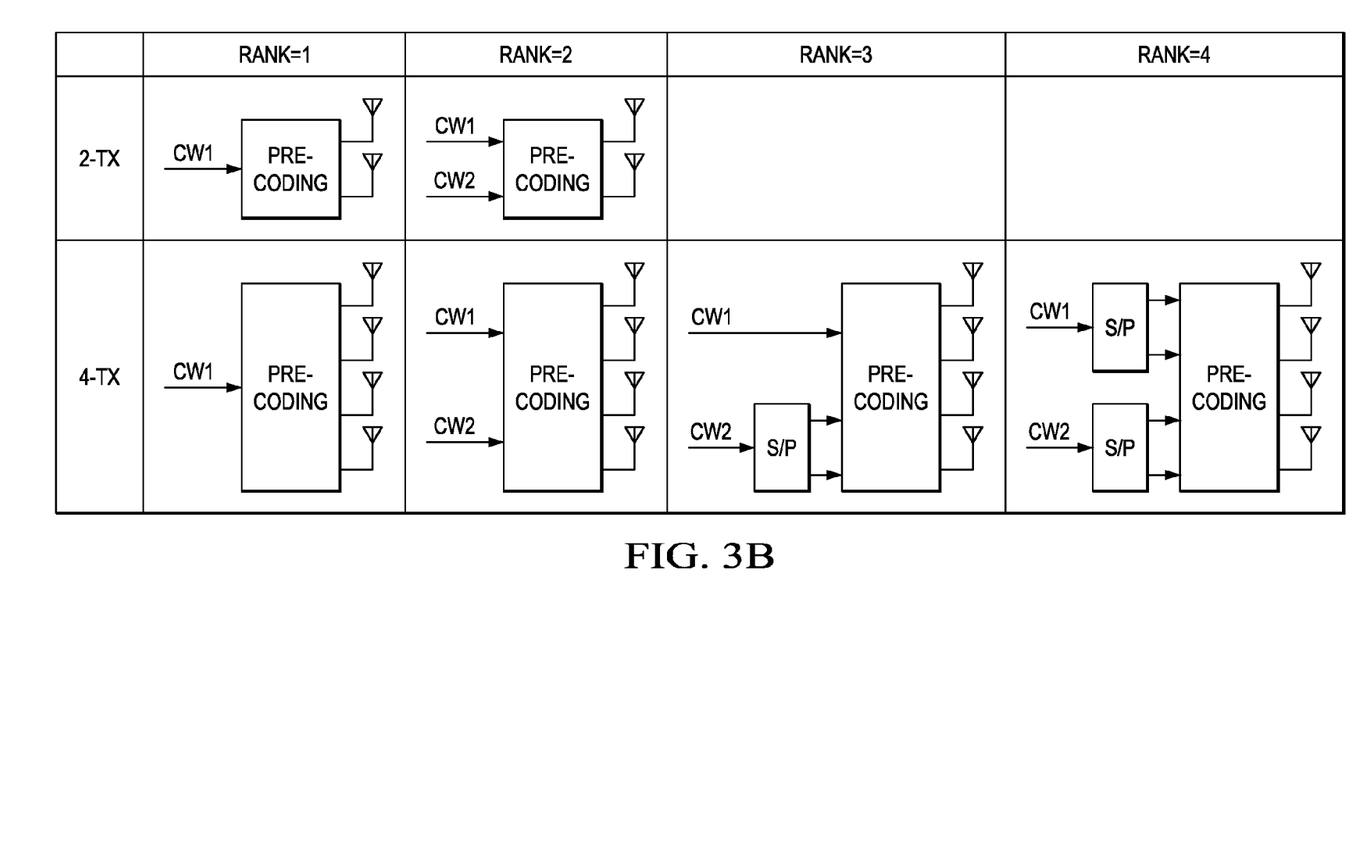

FIG. 3B illustrates an embodiment of layer mapping that employs a maximum of two codewords. This is the same mapping used in current implementations of DL SU-MIMO. In some cases, such symmetry between UL and DL SU-MIMO protocol may be desirable for system design considerations. Moreover, this embodiment allows the use of a SIC-type receiver, which may be beneficial in cases in which OFDMA is used for the UL. One consequence of this layer mapping embodiment is that the number of HARQ processes increases to two. Thus, the uplink grant overhead increases, as, e.g., RSN is doubled. However, no issue with PHICH is expected, since two PHICH resources can be used.

In embodiments in which a large-delay CDD is applied across all the layers, layer permutation may be performed across subcarriers after the codeword-to-layer mapping and before pre-coding. If large-delay CDD is applied across the two codewords, codeword permutation may be performed across sub-carriers right before codeword-to-layer mapping. In some embodiments, large-delay CDD is implemented as permutation, e.g., across layers or codewords, without the use of a DFT matrix.

Figure 3C:
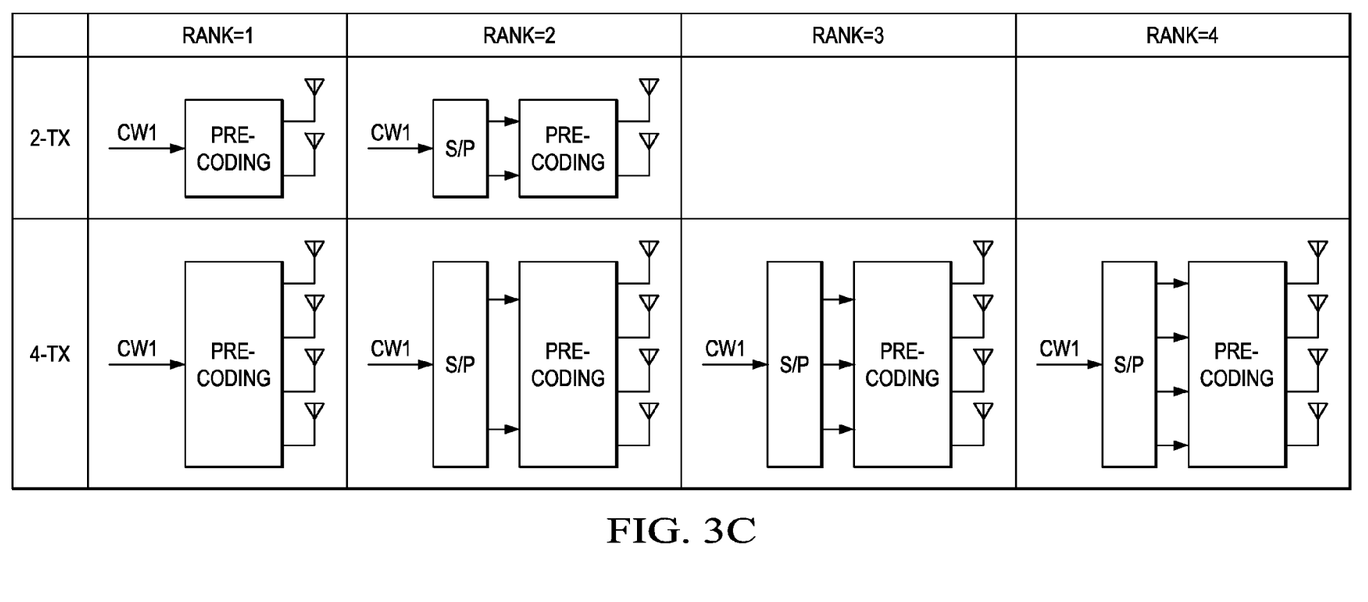

FIG. 3C illustrates an embodiment that employs a single codeword regardless of the number of layers. This embodiment may result in similar performance to the embodiment of FIG. 3A if a MAP decoder is used. This is not expected to significantly burden eNodeB 150 configuration, as the eNodeB 150 hardware and software is not constrained as is a UE such as a mobile handset. In this embodiment, the number of HARQ processes is one.

In some embodiments represented by FIG. 3B, one HARQ process is employed for both codewords of FIG. 3B. Sometimes this approach is referred to as spatial ACK/NAK bundling. In this case, the HARQ overhead is the same as the embodiment of FIG. 3C while allowing the use of an SIC-type receiver, with associated gain. Only one HARQ-related redundancy version field (if applicable), and one new data indicator are used in the uplink grant for both codewords. To support SIC receiver, it is also possible to assign one MCS indication field for each codeword despite the use of spatial ACK/NAK bundling. Otherwise, a single shared MCS field suffices. At the same time, only one DL ACK/NAK resource is needed since both codewords share the same ACK/NAK. To reduce the loss due to spatial ACK/NAK bundling, a layer diversity scheme such as the large-delay CDD can be used. The large diversity scheme can be applied across all the layers or only across the two codewords.

Table I summarizes relevant differences between the embodiments of FIG. 3B and FIG. 3C. DFT-spread OFDMA or SC-FDMA modulation is assumed in all cases in Table I.

TABLE I

| System Aspect | FIG. 3B | FIG. 3C |
|---|---|---|
| Number of Codewords | Minimum of 2 or the number of layers | 1 |
| Advanced Receiver | SIC-type is applicable | SIC is not applicable. Turbo MAP receiver tends to be more complex than SIC for 4 × 4 signaling |
| Number of HARQ processes across layers | 2 | 1 |
| DL control overhead other than RI and PMI | 1) Additional MCS-RV and NDI fields for the second codeword/TBS 2) Additional PHICH resources | None |
| Other Issues | Commonality with DL SU-MIMO | |

Figure 3D:
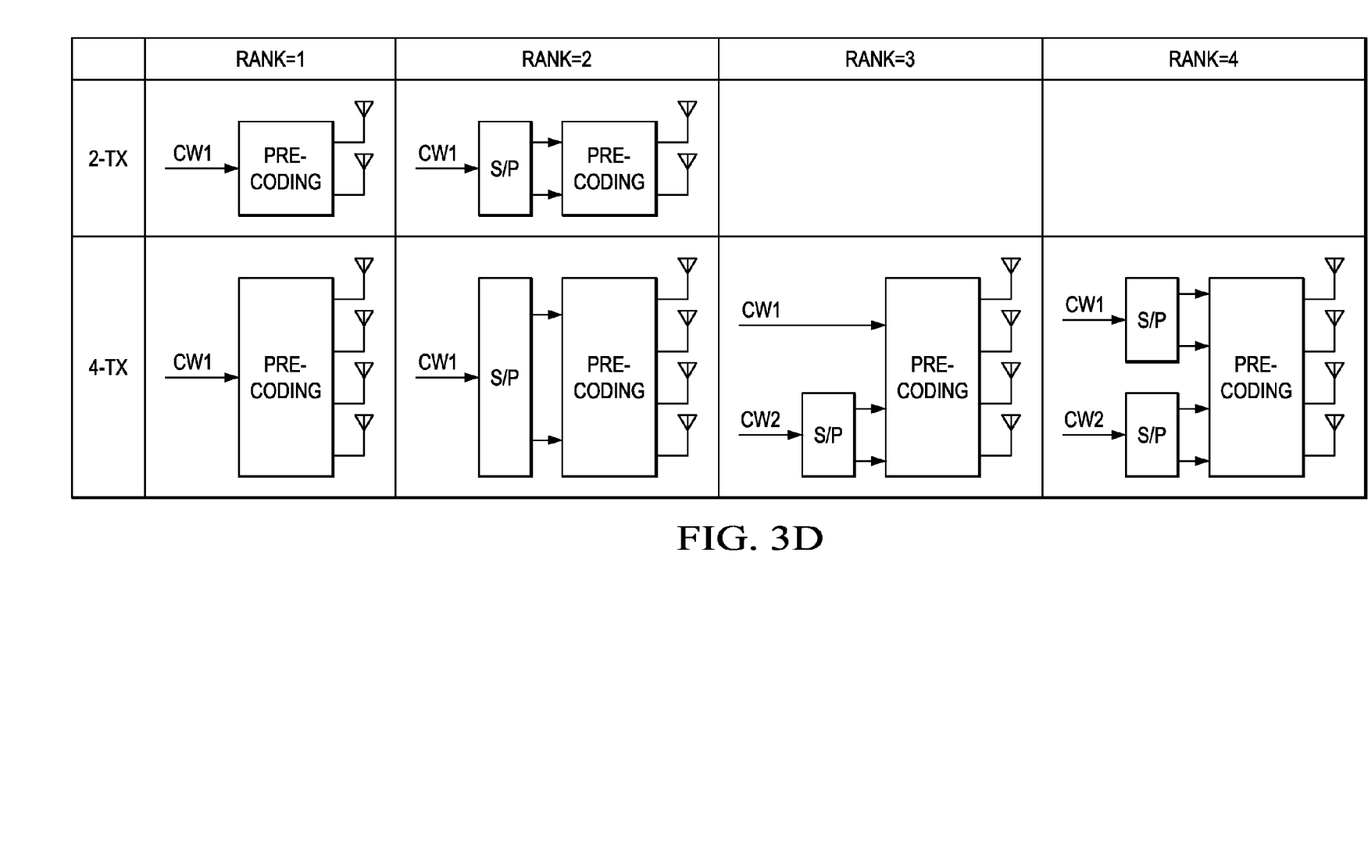

FIG. 3D illustrates an embodiment that may be viewed as a hybrid of the embodiments of FIGS. 3B and 3C. A single codeword structure is employed for 1- and 2-layer transmission for both the 2-TX and the 4-TX cases. Two codewords are utilized for 3- and 4-layer transmission. Although an SIC receiver may be configured at the eNodeB 150, the 2-layer transmission does not benefit from the SIC.

As mentioned above, pre-coding may be codebook-based or non-codebook-based, and both are possible due to the precoded DMRS. Both approaches are contemplated for use in the embodiments described herein. In codebook-based pre-coding, precoder selection is done at the eNodeB 150. This configuration eases the burden on the UE 100, and simpler to test than is non-codebook-based pre-coding. However, codebook-based pre-coding is performance-limited relative to non-codebook-based pre-coding. In embodiments using codebook-based pre-coding, the codebook may be constant modulus (CM). A finite alphabet is desirable in some cases, but not essential. The DL SU-MIMO codebook may be copied to the UL SU-MIMO codebook. In some embodiments, the nested property of the DL SU-MIMO codebook is omitted. In some embodiments a UL SU-MIMO codebook is used that is CM and does not include nesting. An UL SU-MIMO codebook is possible that is larger than the DL codebook. However, a larger codebook may not be desirable in some cases due to greater PMI overhead on PDDCH.

In non-codebook-based pre-coding, precoder selection occurs at the UE 100. There is no size limitation in this case. Thus, pre-coding performance may be better in some cases than for the codebook-based pre-coding. However, testing may be difficult unless precoder selection at the UE 100 is standardized, which is a typically impracticable. The transmit PMI may be eliminated from the uplink grant, reducing PDCCH overhead. However, it may be necessary to precode the SRS for channel quality estimation. Moreover, it may be necessary to introduce an additional DL control signaling entity, e.g., for FDD, which may be needed for TDD, and for calibration. Hence, the overall overhead is expected to be higher for non-codebook-based pre-coding than for codebook-based pre-coding.

In light of the preceding considerations, some preferred embodiments use codebook-based pre-coding.

As discussed previously, the uplink grant is a set of parameters sent by the eNodeB 150 to the UE 100 that instruct the UE 100 to use certain transmission and data format protocols. Table II includes various parameters of the uplink grant for the conventional case of single-antenna uplink transmission as in E-UTRA Rel. 8, e.g., Format 0, and those of two embodiments of the disclosure. Field bit lengths are tabulated for each parameter. In a first embodiment, the uplink grant is a CL-SM 1CW/2CW-1 where a single DL ACK/NAK is transmitted for one/two codewords. The second embodiment is a UL-CLSM 2CW-2 where two DL ACK/NAK bits are transmitted for two UL-MIMO codewords. The embodiments of Table II assume the following:

1) The DL CLSM codebooks in E-UTRA Rel. 8 are reused along with dynamic rank adaptation.

2) To avoid excessive reduction in the available number of DMRS resources per cell, only up to 2 DMRS cyclic shifts are assigned even for 4-layer transmission. Furthermore, assigning up to 4 DMRS cyclic shifts for 4×4 MIMO further increases the DCI payload to six bits, which is undesirable. To support 4-layer transmission, it is possible to employ orthogonal covering across the two DMRS symbols within each subframe.

3) Currently, DCI format 0 and 1A share the same payload size to enable scheduling with format 1A without increasing the number of blind decodes. When a UE is configured to operate in UL SU-MIMO mode, a different DCI format (designated 0B, e.g.) is used. In that case, it is possible to ensure that DCI format 0B and 1B (closed-loop rank-1 pre-coding) share the same payload size. As both eNodeBs and UEs operate with multiple antenna ports, this seems more natural than enforcing the same payload size for formats 0B and 1A.

TABLE II

| | Format 0 (SIMO) | | UL-CLSM 1CW/2CW-1 | | UL-CLSM 2CW-2 | |
|---|---|---|---|---|---|---|
| Field | 5 MHz | 20 MHz | 5 MHz | 20 MHz | 5 MHz | 20 MHz |
| Format Flag | 1 | 1 | 1 | 1 | 1 | 1 |
| Hopping Flag | 1 | 1 | 1 | 1 | 1 | 1 |
| RB Assignment | 9 | 13 | 9 | 13 | 9 | 13 |
| MCS-RV | 5 | 5 | 5 | 5 | 5 | 5 |
| New Data Indicator | 1 | 1 | 1 | 1 | 1 | 1 |

TABLE II-continued

| Field | Format 0 (SIMO) 5 MHz | Format 0 (SIMO) 20 MHz | UL-CLSM 1CW/2CW-1 5 MHz | UL-CLSM 1CW/2CW-1 20 MHz | UL-CLSM 2CW-2 5 MHz | UL-CLSM 2CW-2 20 MHz |
|---|---|---|---|---|---|---|
| TPC | 2 | 2 | 2 | 2 | 2 | 2 |
| Cyclic Shift for DMRS | 3 | 3 | 6 | 6 | 6 | 6 |
| CQI Request | 1 | 1 | 1 | 1 | 1 | 1 |
| UL Index (TDD only) | 2 | 2 | 2 | 2 | 2 | 2 |
| RNTI/CRC | 16 | 16 | 16 | 16 | 16 | 16 |
| PMI (2 or 4-Tx) | — | — | 2 or 4 | 2 or 4 | 2 or 4 | 2 or 4 |
| RI (2 or 4-Tx) | — | — | 1 or 2 | 1 or 2 | 1 or 2 | 1 or 2 |
| MCS-RV for 2$^{nd}$ CW | — | — | — | — | 5 | 5 |
| New Data Indicator for 2$^{nd}$ CW | — | — | — | — | 1 | 1 |
| Total | 39 | 43 | 45 or 48 | 49 or 52 | 51 or 54 | 55 or 58 |

Compared with the conventional format 0, the 2CW-2 mapping increases the DCI payload by 31%-38% for 5 MHz bandwidth. The corresponding increase for 1CW or 2CW-1 mapping is 15%-23%.

The number of DL ACK/NAKs per UE 100 depends on the layer mapping scheme. The use of up to two codewords requires 2 DL ACK/NAKs per UE 100 unless one HARQ entity is assigned to both codewords. This exception implies that one MCS-RV and NDI is shared.

The impact of the larger uplink grant on PHICH assignment is expected to be small, and in many cases negligible. Different codewords (or, in general, layers) are associated with different DMRS cyclic shifts. When the number of DL ACK/NAKs is smaller that the number of assigned DMRS cyclic shifts, the PHICH assignment can be associated with a subset of the available cyclic shift indices.

In some embodiments, the cooperative signaling between the UE 100 and the eNodeB 150 uses transmit diversity, while in others open-loop spatial multiplexing (OL-SM) is used. Transmit diversity is typically used for persistent transmission. However, OL-SM may extend the advantages of MIMO to higher UE 100 speed. The following considerations are relevant to the choice between these two methods.

First considering transmit diversity, antenna switching is expected to be inefficient when two RF chains are available. Thus, another transmit diversity scheme that effectively uses both RF chains should be used. Moreover, if both SC-FDMA and OFDMA are configured for spatial multiplexing, then it is desirable to have a common scheme that works well with both these techniques.

In some embodiments, SFBC (space-frequency block code)/SFBC-FSTD (space-frequency block code with frequency switched time diversity) may be used in conjunction with transmit diversity, though it may not be fully compatible. In such cases, the SFBC operation may be performed after the DFT pre-coding for SC-FDMA. In other embodiments, CDD or FSTD may be used. Standardization is not generally required in such embodiments, as they may be implemented transparently.

Figure 4A:
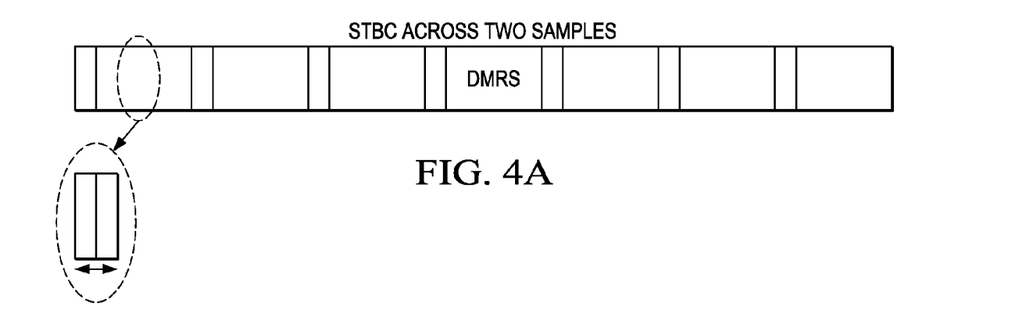
FIG. 4 illustrates STBC transmission.
Figure 4B:
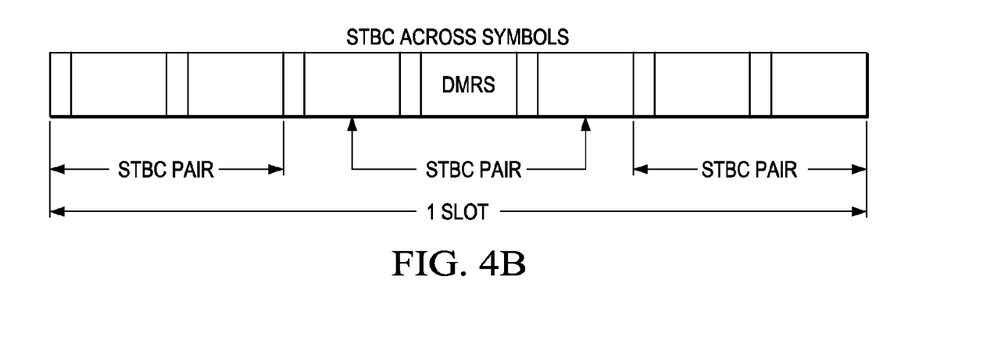

In another embodiment, the transmit module 110 is configured to employ space-time block code (STBC) across data samples in the time domain. STBC may be used in conjunction with SC-FDMA, e.g. In some cases, the STBC operation is performed across two samples within each symbol. An example of such an embodiment is illustrated in FIG. 4A. In some cases, the STBC operation is performed across two symbols. Such an embodiment is illustrated, e.g., by FIG. 4B.

Considering the OL-SM scheme, in some embodiments, a large-delay CDD with precoder hopping may be used. This scheme is essentially the same scheme used with DL SU-MIMO. In some cases, the rank-1 scheme may need modification, depending on the transmit diversity scheme. In some other embodiments, FDR linear dispersion code may be used with different ranks. Such a scheme is sometimes known as "Golden code," e.g. In some cases, however, this scheme may not be compatible with DC-FDMA.

Figure 5:
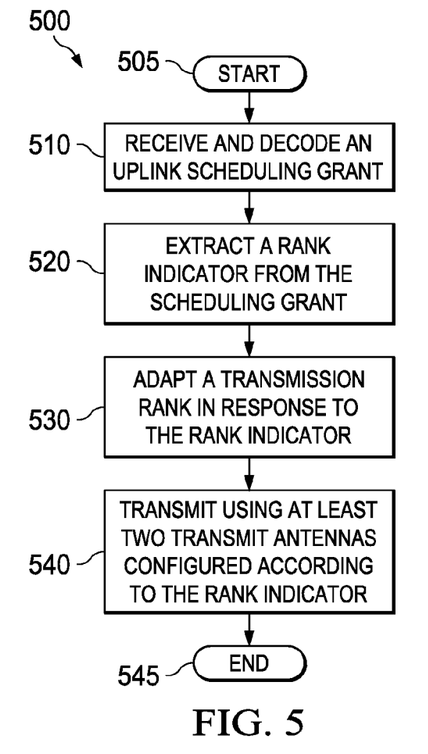
FIGS. 5 and 6 illustrate methods.

FIG. 5 illustrates a method, generally designated 500, of operating a transmitter in a user equipment device. The method is described without limitation using the UE 100, e.g. The method begins with a step 505. In a step 510, the transmitter receives and decodes an uplink scheduling grant. In a step 520, the transmitter extracts an RI from the grant. In some embodiments, the transmitter also extracts a PMI from the grant, and derives a pre-coding matrix associated with the PMI. In a step 530, the transmitter adapts a transmission rank in response to the RI. At least two transmit data streams are formed, e.g., the spatial streams output by the module 125. Optionally, the adapting includes mapping a maximum of two codewords to transmit layers. In a step 540, the transmitter transmits the data streams using at least two transmit antennas. The antennas are configured according to the recovered transmission rank. In some embodiments, the transmitter employs space-time block code across data samples in the time domain. The method 500 ends with a step 545.

Figure 6:
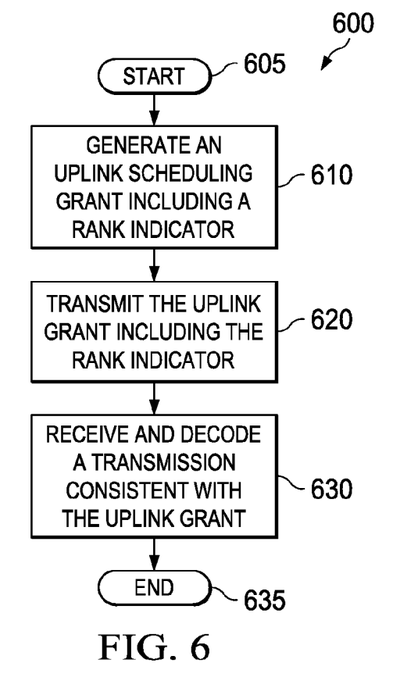

FIG. 6 illustrates a method, generally designated 600, of operating a base station. The method is described without limitation using the eNodeB 150, e.g. The base station has at least two receive antennas. The method begins with a step 605. In a step 610, the base station generates an uplink scheduling grant including an RI. In some embodiments, the uplink grant also includes a PMI. The base station may select the RI in response to a received reference signal, e.g., a SRS or an MDRS. Optionally, a PMI may also be selected in response to the reference signal and included in the grant. In a step 620, the base station transmits the grant, including the RI, and optionally the PMI, to the UE 100. In some embodiments, the base station transmits the grant on a downlink control channel. In a step 630, the base station receives and decodes a transmission that is consistent with the uplink grant. Such a transmission may be sent, e.g., by a UE device such as the UE 100. The method ends with a step 635.

Those skilled in the art to which this application relates will appreciate that other and further additions, deletions, substitutions and modifications may be made to the described embodiments.

What is claimed is:
1. A method of operating a transmitter in a user equipment device, comprising:
   receiving and decoding an uplink schedule grant;
   extracting a rank indicator from said grant;
   adapting a transmission rank in response to said rank indicator; and
   transmitting using at least two transmit antennas configured according to said rank indicator, wherein said transmitting communicates with a base station via closed-loop spatial multiplexing.

2. A base station having at least two receive antennas, comprising:
- a control information generator operable to generate an uplink scheduling grant including a rank indicator, wherein said generator is configured to transmit said grant on a downlink control channel;
- a control information encoder configured to transmit said uplink grant including said rank indicator; and
- a receive module configured to receive and decode a transmission consistent with said uplink grant.

3. A method of operating a base station having at least two receive antennas, comprising:
- generating an uplink scheduling grant including a rank indicator;
- transmitting said grant including said rank indicator on a downlink control channel; and
- receiving and decoding a transmission consistent with said uplink grant.

* * * * *